(12) United States Patent
Uhlhorn et al.

(10) Patent No.: US 7,538,746 B2
(45) Date of Patent: May 26, 2009

(54) DIRECT OCULAR VIRTUAL 3D WORKSPACE

(75) Inventors: Brian L. Uhlhorn, Eagan, MN (US);
Robert J. Monson, St. Paul, MN (US);
Steven H. Ernst, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 782 days.

(21) Appl. No.: 11/187,771

(22) Filed: Jul. 22, 2005

(65) Prior Publication Data
US 2006/0238442 A1 Oct. 26, 2006

Related U.S. Application Data

(60) Provisional application No. 60/590,898, filed on Jul. 23, 2004.

(51) Int. Cl.
*G09G 5/00* (2006.01)

(52) U.S. Cl. .......................................................... 345/8

(58) Field of Classification Search .............. 345/6–9, 345/1.1–1.3; 348/42, 51–53, 115; 359/1, 359/9–11, 13–15, 23, 27–32, 42, 443, 466, 359/467; 353/7
See application file for complete search history.

(56) References Cited

U.S. PATENT DOCUMENTS

| | | | | |
|---|---|---|---|---|
| 5,661,667 A | * | 8/1997 | Rueb et al. | 702/95 |
| 5,781,229 A | * | 7/1998 | Zediker et al. | 348/51 |
| 5,855,425 A | * | 1/1999 | Hamagishi | 353/7 |
| 6,278,418 B1 | * | 8/2001 | Doi | 345/7 |
| 6,937,210 B1 | * | 8/2005 | MacDonald | 345/1.1 |
| 2002/0135738 A1 | * | 9/2002 | Cok et al. | 353/7 |
| 2003/0043146 A1 | * | 3/2003 | Kitamura et al. | 345/419 |
| 2007/0127121 A1 | * | 6/2007 | Maximus et al. | 359/465 |

OTHER PUBLICATIONS

Interactive Stereoscopic Display for Three or More Users—Authors: Kitamura, Yoshifumi; Konishi, Takashige; Yamamoto, Sumihiko; Kishino, Fumio—Published: Aug. 2001—Publisher: Osaka University ACM SIGGRAPH, Los Angeles, CA, USA pp. 231-239.*
John R. Lewis, "In the Eye of the Beholder", IEEE Spectrum, May 2004, pp. 24-28.
Rose, Melinda, "Microdisplays: Coming Soon to an Eye Near You?" Photonics Spectra, Sep. 2008, pp. 68-69.

* cited by examiner

*Primary Examiner*—Richard Hjerpe
*Assistant Examiner*—Carolyn R Edwards
(74) *Attorney, Agent, or Firm*—Hamre, Schumann, Mueller & Larson, P.C.

(57) ABSTRACT

A direct ocular virtual 3D workspace (laser-based 3D display system) utilizes traditional binocular methods of image composition to produce a 3D workspace in the observers' psyche. This direct ocular virtual 3D workspace is implemented such that in moving environments, such as on a ship or vehicle, the immersion of the individual into the display environment will not result in vertigo and/or motion sickness. This is resolved by utilizing a system that accomplishes eye-tracking, and produces the display image within the eye by means of laser projection. Two images can thus be projected into an individual's eyes to produce a 3D holographic-like image space. The individual will still maintain partial vision, resulting in a holographic-like display in space that the observer can look through. The images provided to multiple collaborators/users are geometrically corrected for each collaborator.

18 Claims, 4 Drawing Sheets

DIRECT OCULAR VIRTUAL 3D WORKSPACE

RELATED PATENT APPLICATIONS

This application claims the benefit, under 35 U.S.C. §119 (e)(1), of U.S. Provisional Application No. 60/590,898, entitled Direct Ocular Virtual 3D Workspace, filed Jul. 23, 2004 by Brian L. Uhlhorn, Robert J. Monson and Steven H. Ernst.

BACKGROUND OF THE INVENTION

1. Field of the Invention

This invention relates generally to displays, and more particularly to a laser-based, three-dimensional (3D) display system that generates a holographic-like image in space for simultaneous observation and interaction by a plurality of display system users.

2. Description of the Prior Art

Military systems are becoming more complex with a larger array of information being supplied at a faster rate to fewer decision makers (war fighters) at all levels of the decision chain. The war fighter, for example, needs tools and resources that provide the sufficient and requisite leverage to respond to this challenge. Such tools and resources are presently limited to use of 1) an immersive environment such as the CAVE system designed and developed by Iowa State University, or 2) individual displays for each participant, wherein collaboration is achieved via a non-intuitive pointing device within the display system, e.g. mouse, track, etc.

Modern laser-based 3D display systems are capable of providing such tools and resources for use by a single system user, such as that described by John R. Lewis in his article *In the Eye of the Beholder*, IEEE Spectrum, pp. 24-28, May 2004. A need exists however, for a display system that allows simultaneous immersion of multiple users into a holographic-like display environment without disruption of the holographic-like image produced by the laser-based 3D display system, or without causing individual user vertigo or motion sickness.

In view of the foregoing background, it would be extremely beneficial and advantageous to provide a next generation interactive display system (direct ocular virtual 3D workspace) that allows simultaneous observation and interaction via immersion of multiple users into the display environment without overwriting other visual data cues.

SUMMARY OF THE INVENTION

The present invention is directed to a direct ocular virtual 3D workspace (laser-based 3D display system) that utilizes traditional binocular methods of image composition to produce a 3D workspace in the observers' psyche. This direct ocular virtual 3D workspace is implemented such that in moving environments, such as on a ship or vehicle, the immersion of the individual into the display environment will not result in vertigo and/or motion sickness. This is resolved by utilizing a system that accomplishes eye-tracking, and produces the display image within the eye by means of laser projection. Two images can thus be projected into an individual's eyes to produce a 3D holographic-like image space. The individual will still maintain partial vision, resulting in a holographic-like display in space that the observer can look through. The images provided to multiple collaborators/users are geometrically corrected for each collaborator, allowing multiple individuals to see the same 3D image space from their particular viewing location without overwriting other visual data cues. This allows an individual collaborator to point within the image space such that other collaborators could see the pointing finger within their own 3D image space; and all parties would see the same item identified by the individual collaborator.

A feature of the direct ocular virtual 3D workspace is the generation of a rich three-dimensional information display.

Another feature of the direct ocular virtual 3D workspace is the provision of user interaction with systems and other users in a 3D environment.

Yet another feature of the direct ocular virtual 3D workspace is enhanced situational awareness.

Still another feature of the direct ocular virtual 3D workspace is improved safety/reduced collateral damage.

Still another feature of the direct ocular virtual 3D workspace is more effective planning and execution.

Still another feature of the direct ocular virtual 3D workspace is improved target detection, tracking, classification, identification and targeting.

BRIEF DESCRIPTION OF THE DRAWINGS

Other aspects, features and advantages of the present invention will be readily appreciated as the invention becomes better understood by reference to the following detailed description when considered in connection with the accompanying drawing figures wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
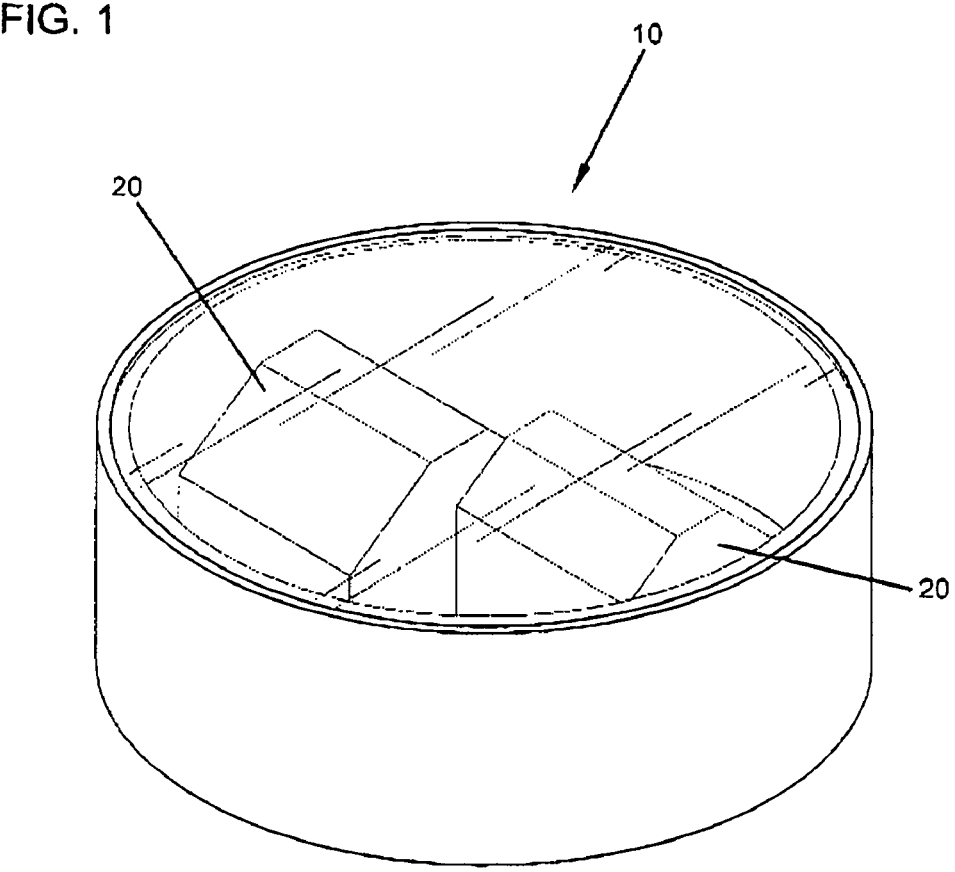
FIG. 1 depicts a pedestal assembly having an integral laser projector to implement a direct ocular virtual 3D workspace.

Looking now at FIG. 1, a pedestal assembly 10 is configured with a laser projector 20 to implement a direct ocular virtual 3D workspace. Pedestal assembly 10 utilizes traditional binocular methods of image composition to produce a 3D workspace in the observer's psyche. In moving environments, such as on a ship or vehicle, the immersion of the individual into the display environment can cause vertigo and motion sickness, as stated herein before. Pedestal assembly 10 resolves this undesirable characteristic by use of eye-tracking, described in further detail herein below with reference to FIG. 3, to produce the display image within the observer's eye by means of laser projection. Two images can thus be projected into an individual's eye to produce a 3D image space. The individual will still maintain partial vision, resulting in a holographic-like display in space that the observer can look through.

Figure 2:
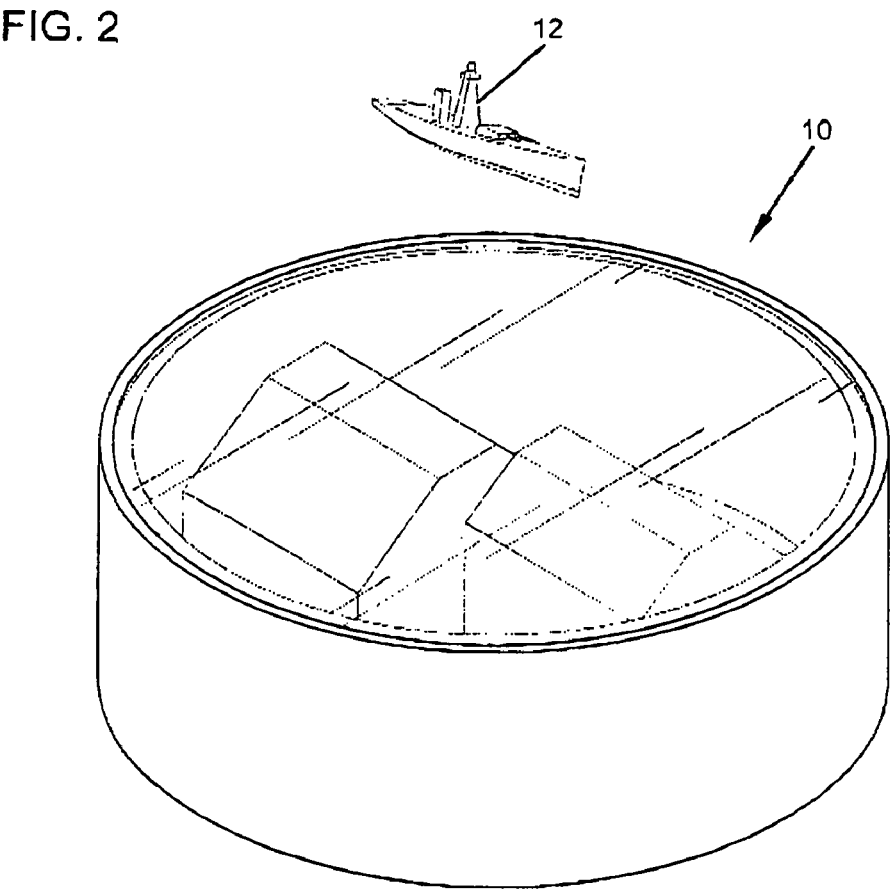
FIG. 2 depicts the pedestal assembly shown in FIG. 1 generating a holographic-like image in space.

FIG. 2 depicts the pedestal assembly 10 shown in FIG. 1 generating a holographic-like image 12 in space. Due to eye-tracking, as discussed above, an individual can move to a different point around the pedestal assembly 10 to view the same 3D image space from a different viewing location without overwriting other visual data cues. Current techniques for achieving the aforesaid feature employ an immersive environment such as the CAVE system technology developed by Iowa State University, or an individual display, wherein pointing is achieved via a pointing device such as a mouse, trackball, etc. The CAVE system technology is undesirable since movement of an individual within the CAVE system environment causes disruption of the resultant holographic-like image in space.

Figure 3:
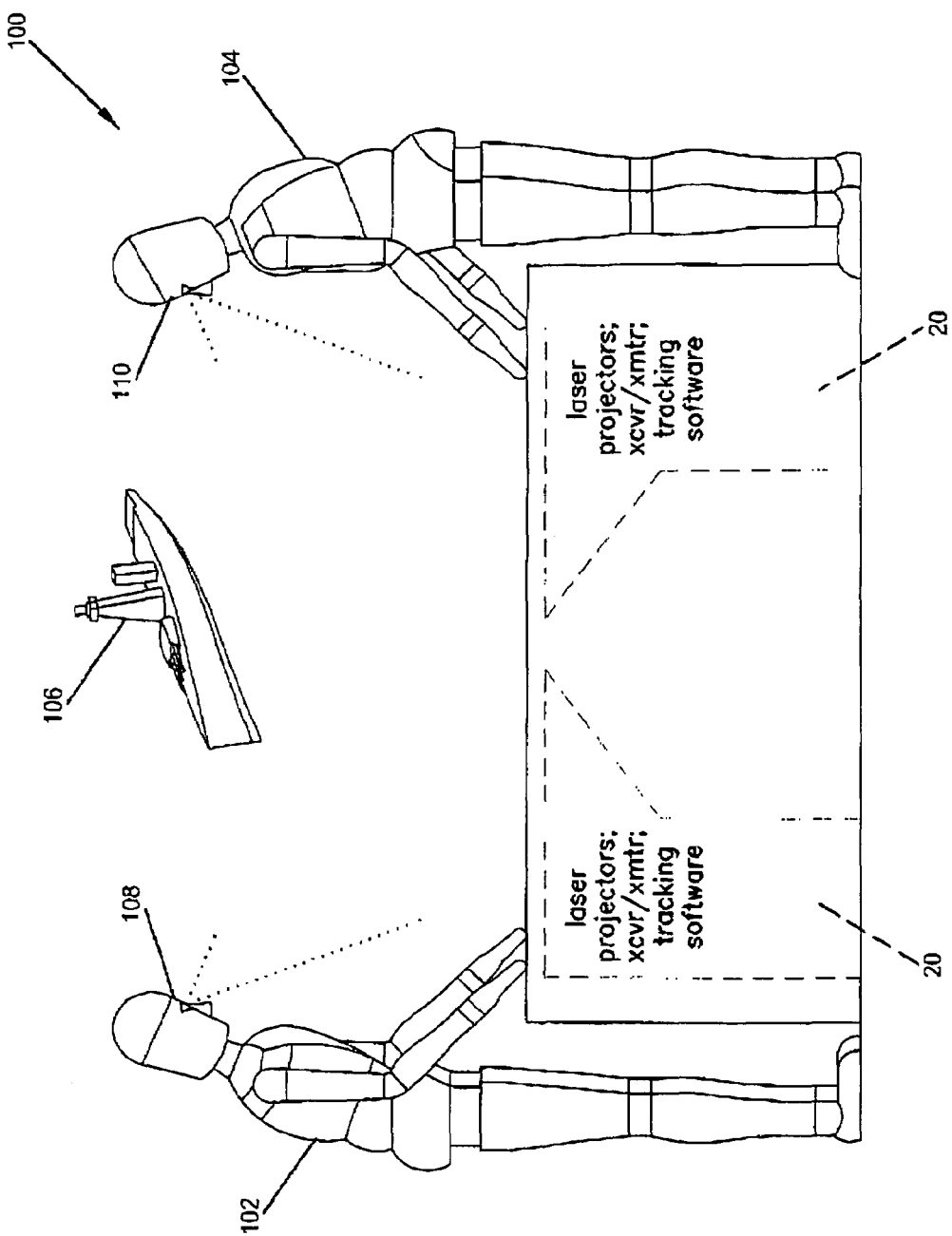
FIG. 3 illustrates a side view of a two user direct ocular virtual 3D workspace layout including one pair of laser projectors such as that shown in FIG. 1 according to one embodiment of the present invention.

Moving now to FIG. 3, a side view of a two user direct ocular virtual 3D workspace system layout 100 can be seen to include one pair of laser projector assemblies 20 such as the one shown in FIG. 1 according to one embodiment of the present invention. The two laser projector assemblies 20 are configured with optical transceivers and tracking software to continuously track eye movement and location of the observers 102, 104.

Many techniques are suitable to implement the requisite vertical and horizontal rotation of the laser projector assemblies 20 to accommodate the eye tracking. A rotational gimbal apparatus, for example, can be employed to provide the requisite movement of the laser projector assemblies 20.

Several known techniques can be employed to accomplish the eye tracking. Eye movement and location may, for example, be accomplished using an optical transceiver in association with each laser projector 20 to generate positional signals. A second optical transceiver 108, 110, can then be employed via each workspace user to receive and retransmit signals back to the respective optical transmitter. Appropriate algorithmic tracking and calibration software, including handshaking software between the laser projector transceiver and workspace user transceiver 108, 110, then functions to establish a calibrated wireless link between the laser projector 20 transceivers and the respective workspace user transceiver 108, 110, thus allowing the laser projector 20 to track the respective workspace user eye movement and location.

Traditional binocular methods of image composition are employed to produce a 3D workspace in each observer's 102, 104 psyche by generating the display within each observer's 102, 104 eye by means of laser projection. Two images, as stated herein before, are projected into each observer's eye to produce a 3D image space. Each observer 102, 104 will still maintain partial vision, resulting in a common holographic-like display in space that the observer 102, 104 can look through.

The image 106 provided to multiple observers (collaborators) 102, 104 is geometrically corrected for each collaborator, allowing multiple individuals to see the same 3D image space from their particular viewing location without overwriting other visual data cues. The algorithmic geometric correction can be implemented, for example, via software that may be an integral part of the workspace user's transceiver, implemented via micro-electro-mechanical system (MEMS) technology. The requisite eye-tracking can be accomplished using any number of known tracking technologies such as, but not limited to, for example, optical mirrors, gimbal, gyro, phased-array, MEMS technology, and the like familiar to those skilled in the particular arts employed to implement eye-tracking. The selected eye-tracking technology is then configured, using appropriate algorithmic software, to geometrically correct the image provided to each collaborator 102, 104, allowing multiple individuals to see the same 3D image space from their particular viewing location without overwriting other visual data cues, as stated herein before. An individual collaborator can then point a finger within the image space, and other collaborators could see the pointing finger within their own 3D image space such that all parties would see the same item identified.

Because the two user system layout 100 employs more than one projector assembly 20 configured for simultaneous use by multiple observers (collaborators) 102, 104, the individual collaborators 102, 104 can communicate with one another by means of body language, tone and content not available using known laser-based 3D display system technology. The foregoing techniques also allow remote collaborators to be included in the environment, allowing true remote collaboration between individual sites. Further, allowing additional visual cues not currently present in an immersive environment will lessen the likelihood of vertigo and motion sickness that is inherently associated with known immersive environments.

In summary explanation, a direct ocular virtual 3D workspace 100 employs multiple projectors 20 within a table-like pedestal assembly 10. The projectors 20 utilize traditional technology to provide binocular visual data for each user utilizing eye position scanning and projection to the location of the user's iris. Since the workspace 100 employs multiple output devices (projectors) 20, each device is dedicated to a specific user location to ensure specific user data is geometrically correct with respect to other users of the workspace 100. This technique allows collaboration within the 3-dimensional viewing space, with semi-opaque images provided to allow direct interface between users of the system.

Figure 4A:
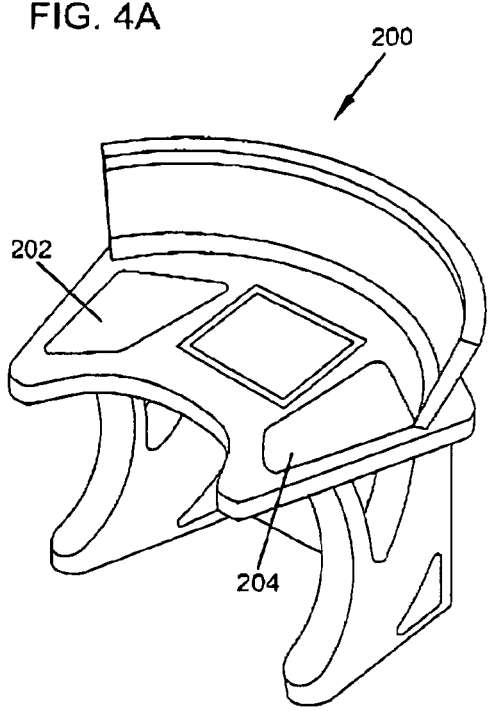
FIGS. 4A, 4B and 4C depict different views of a workspace having stereoscopic displays for sensing and tracking immersion of an external object into the workspace.
Figure 4B:
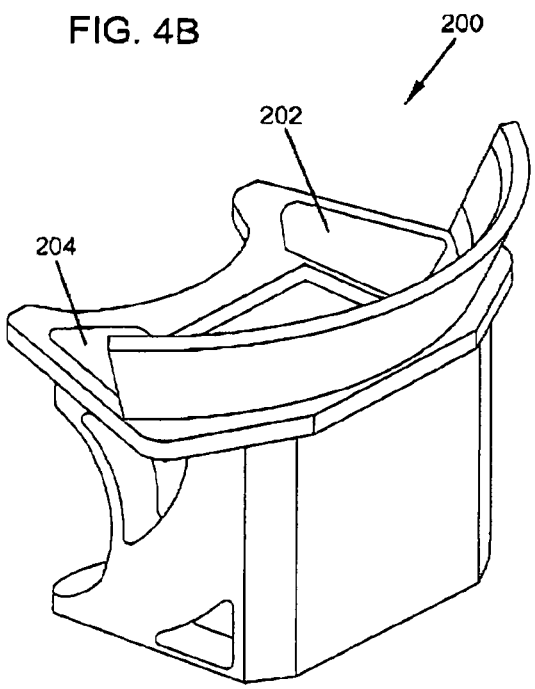
Figure 4C:
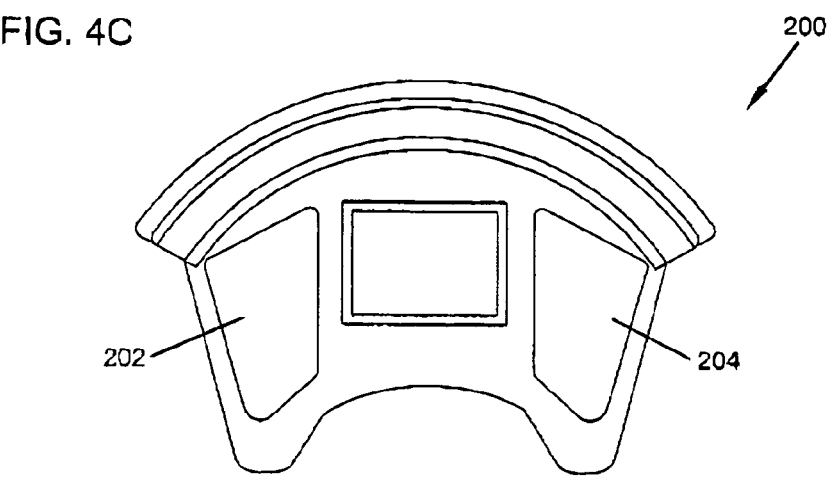

Direct interfacing may employ any number of techniques such as, but not limited to, using stereoscopic displays in association with the pedestal such that when a collaborator's finger is encased in a white glove which is then inserted into the holographic-like image space and between the stereoscopic displays, the appropriate algorithmic software will synchronize the finger location data with the holographic-like image data to allow direct interfacing between the users of the workspace 100. FIG. 4 illustrates different views showing one embodiment of a workspace 200 having stereoscopic displays 202, 204.

In view of the above, it can be seen the present invention presents a significant advancement in the art of workstation design. Further, this invention has been described in considerable detail in order to provide those skilled in the ocular arts with the information needed to apply the novel principles and to construct and use such specialized components as are required.

It should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

The complete disclosure of all patents, patent documents, and publications are incorporated herein by reference as if individually incorporated.

What is claimed is:

1. A direct ocular virtual three-dimensional (3D) workspace comprising:
   a plurality of laser projectors;
   means for tracking eye movement and eye location associated with at least one workspace user and generating positional signals there from; and means for moving at least two laser projectors within the plurality of laser projectors, in response to the positional signals, such that the at least two laser projectors cause two images to be projected into the at least one workspace user's eyes to produce a three-dimensional holographic-like image space that the at least one workspace user can look through.

2. The direct ocular virtual 3D workspace according to claim 1, further comprising algorithmic software for geometrically correcting the image space associated with each workspace user such that each workspace user will see the same image space from their particular viewing location.

3. The direct ocular virtual 3D workspace according to claim 1, further comprising means for allowing a workspace user to immerse an object into the three-dimensional holographic-like image space without disrupting other workspace user data cues.

4. The direct ocular virtual 3D workspace according to claim 3, wherein the means for allowing a workspace user to immerse an object into the three-dimensional holographic-like image space without disrupting other workspace user data cues comprises:
a plurality of stereoscopic display units; and
algorithmic software responsive to movement and positional data associated with the object immersed within the three-dimensional holographic-like image space and generated via the stereoscopic display units to modify the eye tracking positional signals such that immersion of the object into the three-dimensional holographic-like image space does not disrupt workspace user data cues.

5. The direct ocular virtual 3D workspace according to claim 1, wherein the means for tracking eye movement and eye location comprises:
an optical transceiver associated with each laser projector and operational to generate the positional signals;
an optical transceiver associated with each workspace user; and
algorithmic software to establish a calibrated wireless link between the laser projector transceivers and respective workspace user optical transceivers in response to the optical transceiver positional signals such that each laser projector is positionally calibrated with a single workspace user.

6. The direct ocular virtual 3D workspace according to claim 1, wherein the means for moving at least two laser projectors within the plurality of laser projectors comprises a rotational gimbal apparatus.

7. A direct ocular virtual three-dimensional (3D) workspace comprising:
a plurality of laser projectors; and
means for operating the plurality of laser projectors such that the plurality of laser projectors produce a three-dimensional image space that is geometrically corrected for at least one workspace user, and further such that the at least one workspace user views the same image from their particular viewing location.

8. The direct ocular virtual 3D workspace according to claim 7, wherein the means for operating the plurality of laser projectors comprises:
a horizontally and vertically rotational gimbal device associated with each laser projector and operational to provide horizontal and vertical targeting of each laser projector in response to workspace user eye tracking data; and
an eye tracking system associated with each laser projector and operational to generate eye tracking data associated with a respective workspace user.

9. The direct ocular virtual 3D workspace according to claim 8, wherein the eye tracking system comprises:
an optical transceiver associated with each laser projector;
an optical transceiver associated with each workspace user; and
algorithmic software configured to establish a calibrated wireless link between each laser projector transceiver and a respective workspace user transceiver to provide the horizontal and vertical targeting of each laser projector.

10. The direct ocular virtual 3D workspace according to claim 8, wherein the eye tracking system further comprises algorithmic software configured to geometrically correct the image space associated with each workspace user such that each workspace user will see the same image space from their particular viewing location.

11. The direct ocular virtual 3D workspace according to claim 7, further comprising means for allowing a workspace user to immerse an object into the three-dimensional holographic-like image space without disrupting other workspace user data cues.

12. The direct ocular virtual 3D workspace according to claim 11, wherein the means for allowing a workspace user to immerse an object into the three-dimensional holographic-like image space without disrupting other workspace user data cues comprises:
a plurality of stereoscopic projection units; and
algorithmic software responsive to movement and positional data associated with the object immersed within the three-dimensional holographic-like image space and generated via the stereoscopic projection units to modify the three-dimensional holographic-like image space produced via the laser projectors.

13. A method generating a direct ocular virtual 3D workspace image, the method comprising the steps of:
providing a plurality of laser projectors; and
operating the plurality of laser projectors such that the plurality of laser projectors produce a three-dimensional image space that is geometrically corrected for at least one workspace user, and further such that the at least one workspace user views the same image from their particular viewing location.

14. The method according to claim 13, wherein the step of operating the plurality of laser projectors comprises the steps of:
providing a horizontally and vertically rotational gimbal device associated with each laser projector that is operational to provide horizontal and vertical targeting of each laser projector in response to workspace user eye tracking data;
providing an eye tracking system associated with each laser projector that is operational to generate eye tracking data associated with a respective workspace user; and
operating the horizontally and vertically rotational gimbal device in response to the eye tracking data such that each laser projector will project a desired image into at least one eye of the respective workspace user to produce the 3D image space.

15. The method according to claim 14, further comprising the steps of:
providing algorithmic geometric correction software for geometrically correcting the image space associated with each workspace user; and
operating the horizontally and vertically rotational gimbal device in response to the algorithmic geometric correction software such that workspace user sees the same image space without geometric abnormalities from their particular viewing location.

16. A direct ocular virtual three-dimensional (3D) workspace comprising:
a plurality of laser projectors;
an eye tracking system operational to track eye movement and eye location associated with at least one workspace user and to generate positional signals there from; and
a rotational system operational to rotate at least two laser projectors within the plurality of laser projectors, in response to the positional signals, such that the at least two laser projectors cause two images to be projected into the at least one workspace user's eyes to produce a three-dimensional holographic-like image space that the at least one workspace user can look through.

17. The direct ocular virtual 3D workspace according to claim 16, further comprising algorithmic software configured to modify operation of the eye tracking system to geometrically correct the image space associated with each workspace user such that each workspace user will see the same image space from their particular viewing location.

18. The direct ocular virtual 3D workspace according to claim 1, further comprising an immersion sensing system operational to sense an external object immersed into the 3D holographic-like image space and to modify the resultant 3D holographic-like image space to avoid disruption of other workspace user data cues.

* * * * *